(12) United States Patent
Barbier (10) Patent No.: US 6,196,066 B1
(45) Date of Patent: Mar. 6, 2001

(54) ROTOR AIRCRAFT ROTOR BLADE WITH STATIC AND DYNAMIC BALANCING DEVICE AND BALANCING PROCESS OF A BLADE

(75) Inventor: Bruno Barbier, Ermont (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/351,077

(22) Filed: Jul. 9, 1999

(30) Foreign Application Priority Data

Jul. 17, 1998 (FR) .................................................. 98 09143

(51) Int. Cl.⁷ ...................................................... G01M 1/00
(52) U.S. Cl. ................................................. 73/456; 73/459
(58) Field of Search ............................... 73/455, 456, 457, 73/458, 460, 468, 469, 459; 416/144, 145

(56) References Cited

U.S. PATENT DOCUMENTS

| | | |
|---|---|---|
| 2,451,541 * | 10/1948 | Doman ..................................... 73/456 |
| 3,508,843 | 4/1970 | Schmidt . |
| 3,812,724 * | 5/1974 | Curtz et al. ............................. 73/458 |
| 3,999,888 | 12/1976 | Zincone . |
| 4,150,920 | 4/1979 | Belko . |

FOREIGN PATENT DOCUMENTS 0 237 772   9/1987   (EP) .

* cited by examiner

Primary Examiner—Richard A. Moller
(74) Attorney, Agent, or Firm—Piper Marbury Rudnick & Wolfe (57) ABSTRACT

The balancing device includes static weights, equally distributed by mass in two housings elongated along the span of the blade, and dynamic weights distributed by mass in the two housings so as to ensure the dynamic adjustment of the blade while keeping the preestablished static adjustment, the weights being introduced into the housings and extracted from these latter through a single opening emerging simultaneously in the internal end, towards the blade root, of the two housings symmetrical relative to the pitch centring axis of the blade. This single access opening is able to be closed by a door opening in the extrados or intrados surface of the blade.

21 Claims, 5 Drawing Sheets

ROTOR AIRCRAFT ROTOR BLADE WITH STATIC AND DYNAMIC BALANCING DEVICE AND BALANCING PROCESS OF A BLADE

FIELD OF THE INVENTION

The invention concerns a rotor aircraft rotor blade, in particular a helicopter main rotor blade, fitted with a static and dynamic balancing device in the external end portion, along the span, i.e. towards the blade tip, of the aerodynamic profiled main blade section.

BACKGROUND OF THE INVENTION

The balancing device including static dynamic balancing weights, which are housed in and/or supported by this external end portion of the main blade section, for a good effectiveness of these adjustment weights, which can be placed and held on at least one weight support mounted on the blade.

These weights are used to obtain the static and dynamic adjustment or balancing of a blade. The static adjustment enables the static moment of each blade to be adjusted relative to a standard, this static moment being the product of the mass of the blade and the distance separating, along the blade span, the centre of gravity of the blade from the rotor rotational axis. Respect of this static moment criterion avoids fatigue of the rotor mast, rotating the hub and the rotor blades, caused by an excessive unbalance resulting from too different static moments from one blade to another, and contributes to the comfort and increases the life span of the rotor by decreasing rotor vibrations. This static adjustment enables in a global way the mass tolerances of all the components of a blade to be corrected, such as its spar(s), its extrados and intrados coatings, its padding(s), etc. The maximum capacity of the static adjustment is in general of the order of 1 to 2% of the mass of the blade, and the sensitivity of this adjustment is of the order of a few grams for blades of several dozens of kilograms.

The static adjustment operation consists in placing the blade on a beam provided with a balance, and adding to the blade the necessary quantity of balancing weights to increase the mass of the blade so as to obtain the standard static moment. The balancing weights thus added are neutral in relation to the chord centring, i.e. placed on the chord centring axis or equally distributed either side of this axis, which is a longitudinal axis, extending along the blade span, and passing through the centres of gravity of the successive basic profiled sections of the blade. In general, the chord centring axis is located substantially at 25% of the chord from the blade leading edge (i.e. in the front quarter of the chord) and at mid-thickness of the profile, this chord centring axis, or the blade neutral axis with regard to the chord centring, being able to be merged with the blade twisting axis.

The dynamic adjustment or balancing enables the chord moment of each blade to be adjusted relative to a standard blade, this chord moment being the product of the blade mass and a distance, measured along the chord, between the centre of gravity of the blade and, in principle, the theoretical 20% chord axis from the leading edge corresponding substantially to the position of the centre of gravity along this chord. This adjustment enables, in a global way, the mass defects of all the components of the blade to be corrected, as well as the small profile defects of the blade. This dynamic adjustment is generally completed by an action on tabs or small trailing edge flaps, which are bent in order to give a particular angle of incidence. The capacity of the dynamic adjustment is determined by an empirical formula in which occur parameters such as the blade mass, the position of the weight support(s), etc.

The dynamic adjustment operation consists in comparing, on a test bench, the aerodynamic behaviour of the blade to be adjusted relative to a standard blade, and to transfer, along the chord, blade end masses to the front or to the rear of the blade, between positions which are located either side the chord centring axis, until the aerodynamic behaviour of the blade is in practice made identical to that of the standard blade.

A blade end static and dynamic balancing device enables therefore the balancing of blades intended for a rotor to be adjusted in order to make them interchangeable one by one on this rotor.

Balancing devices are already known for which the weights are placed on blade end pins. A light alloy weight support is fixed, for example by gluing, at the blade end between the extrados and intrados coatings of the blade, and three pins are screwed on this support parallel to one another and along the blade span, so as to project longitudinally outwards from the end of the main blade section of the blade, and the static and dynamic weights are mounted on these pins and retained on them by nuts. The static weights can be supported by the central pin, aligned on the chord centring axis, whereas the dynamic weights, which also contribute to the static balancing of the blade, are distributed on the two other pins, symmetrical with the central pin to the front and to the rear of the blade.

The disadvantages of such a device are that it presents a risk of corrosion at the level of the light alloy weight support. Furthermore, the pins are subjected to bending moments during acceleration and braking phases of the rotor (temporary fatigue), and it is necessary to dismantle the blade tip cap, which encompasses the weights and the portions of the pins supporting them, and which is added to the blade tip, on the end of the main blade section of the blade, in order to have access to the weights during adjustments. Because of this arrangement of the weights, the device presents also great vulnerability in the event of shock to the blade tip, and such a device is incompatible with numerous developed shapes of cap or blade tip, such as the parabolic, serrated, dihedral shapes, etc.

Static and dynamic balancing devices are also known for which the weights are housed in cavities made in the external end portion of the blade main section and which emerge in the external end section of this main blade section. In general, the static and dynamic balancing weights are placed in cylindrical cavities delimited in part by stainless steel tapped tubes which are extended by tubular parts in composite material. The whole is made during the moulding of the blade, in the case of blades mainly of composite material, and forms an integral part of the blade structure. The cavities are closed by stainless steel threaded plugs, held by resilient pins, and accessible on the external end section of the main blade section of the blade.

Such a balancing device avoids numerous disadvantages of a pin type device presented above, but always necessitates the dismantling of the blade tip cap in order to have access to the threaded plugs then to the balancing weights. Moreover, such a device is also incompatible with numerous developed forms of cap or blade tip, with parabolic, serrated or dihedral shapes, etc.

Again static and dynamic balancing devices are known for which the weights are placed in cavities which emerge in the extrados surface of the blade. Casings, formed for example from composite material blocks, generally containing glass fibre, are glued during the moulding of the blade between the extrados and intrados coatings of the blade, and the cavities intended to receive the static and dynamic weights are made in the casings either directly by moulding by means of cinblots, or bored after moulding the blade, the extrados coating of which has access openings to these cavities. Stainless steel doors are fixed on the extrados coating of the blade, with the aid of screws or rivets, in order to close the cavities after the static and dynamic weights have been placed in them. These doors are curved and integrated with the blade profile.

Such a device therefore makes it unnecessary to intervene on the blade tip cap for every intervention on the balancing weights. Furthermore, such a device is compatible with all developed shapes of cap or blade tip, added or forming an integrating part of the blade, since the accessibility to the cavities and to the weights is enabled by the easily accessible doors on the blade extrados, in the external end portion of its main blade section, and which do not therefore extend over the cap.

Such a balancing device comprises however disadvantages: the openings made in the extrados coating are significant, and must therefore be accompanied with reinforcement. The weights are directly supported on the doors, and consequently the doors must be sufficiently rigid to retain the weights subjected to accelerations. The stiffness of the doors is not homogeneous with that of the blade, which leads to sealing problems of the cavities. The respect for the blade profile, particularly important at the end of the blade, necessitates the making of doors curved along the blade profile. Finally, the fixing of the doors is stressing, since the weights are supported on the doors, and consequently requires either fixing by double locking screws, for conformity with aeronautical standards, or a non detachable mounting, with rivets for example.

SUMMARY OF THE INVENTION

The problem at the base of the invention is to propose a static and dynamic balancing device which is of the cavities type housing balancing weights with access on a surface of the blade by means of at least one access door, and which does not present the aforementioned disadvantages, and is better suited to the various practical requirements than the prior art devices presented above.

In particular, an object of the invention is to propose a blade fitted with a static and dynamic balancing device involving insignificant openings in the blade coating, without the weights acting on the doors, and respecting the blade end profile while enabling a placing of the weights in the cavities and their withdrawal from these latter in a simple way.

To this end, and according to the invention, the rotor aircraft rotor blade fitted with a static and dynamic balancing device in the external end portion, towards the blade tip, of the aerodynamic profiled main blade section of the blade, and in which the balancing device includes static balancing weights and static and dynamic balancing weights which are housed in at least two cavities delimited, on either side a blade chord centring axis, in the aforesaid external end portion of the main blade section, and accessible from the outside of the blade by at least one access opening, opening in a surface of the blade and able to be closed by at least one access door fixed in a removable way on aforesaid blade surface, is characterised in that the aforesaid cavities of the balancing device are arranged in two housings elongated substantially in the direction of the blade span and substantially symmetrical to each other on either side of aforesaid chord centring axis, the device including a single access opening, opening in one of the blade extrados and intrados surfaces, and in permanent communication with the internal end, towards the blade root, of each of two elongated housings, so as to enable the introduction and withdrawal of each weight into and out of each housing, as well as a single access door, a first set weights, for the static balancing, intended to be distributed evenly by mass in the two housings, and a second set of weights, for the static and dynamic balancing, intended to be distributed by mass in the two housings so as to ensure the dynamic adjustment of the blade.

The single access door of the device enables an opening made in the blade coating of minimum dimensions, restricted to those enabling the loading and unloading of the balancing weights to be closed. Furthermore, the invention balancing device enables the bench dynamic balancing of the blades to be ensured without the weights falling out, following the opening of the access door, by the design of the device, which enables simultaneously a total security to be ensured under flight forces, and in particular under the effects of centrifugal force, because in flight or with rotating rotor, the weights abut in the end of the housings located towards the blade tip, and the access door is not subjected to any force induced by the masses. In the event of loss of the access door, in flight or with rotating rotor, the weights stay inside the housings and the static and dynamic adjustment of the blades is mainly retained, which enables the continuation of the flight. The unbalance created by the loss of the access door is a minimum, and corresponds to the single weight of this door subjected to centrifugal force, for which reason this door is to advantage of composite materials, in order to reduce its weight.

Each of the two housings can be delimited, at least partially, in and/or by a tubular part integrated in the blade structure, or directly by blade components, and in particular by structural components such as one or more blade spars, so that the housings result from the blade construction.

But to advantage, the balancing device includes in addition a balancing weights support, the aforesaid support being a rigid elongated casing, integrated into the aforesaid external end portion of the main blade section so that the length of the casing is directed substantially along the blade span, and the transverse section of the casing is integrated in the aforesaid aerodynamic profile of the aforesaid main blade section, the two housings being at least partially delimited in the aforesaid casing, in which is also partially arranged the aforesaid access opening.

Because of the presence of the casing, the device fitting the blade of the invention enables not only the blade balancing function to be ensured, but also that of an added mass at the blade end, in order to attain the rotor inertia necessary for a good behaviour of the rotor when windmilling. In view of the chord position of the casing, as well as possibly the small chord and the small relative thickness of the blade profile, it is then to advantage that this added mass is obtained by the casing, made of a heavy metal or alloy, and manufactured by preference substantially less with the blade profile.

On the other hand, in the case where the mass of the blade is sufficient to ensure the rotor inertia necessary for windmilling, the casing can be in a light alloy or of composite materials.

In a simple and economically advantageous version, the two housings are at least partially delimited by two longitudinal grooves each made in respectively one of the two large lateral surfaces of the casing which are turned respectively towards the leading edge and the trailing edge of the blade.

To facilitate the access to the two casing grooves, the access opening includes an opening made in the extrados or intrados surface coating of the blade and a substantially cylindrical blind cavity, made in the extrados or intrados surface of the casing which is free under the aforesaid coating opening, in the internal longitudinal end part of the casing, towards the blade root.

The access door closes the aforesaid opening in the blade coating and includes to advantage a pin projecting on the internal surface of the door to close at least partially the aforesaid blind cavity made in the casing, so as to prevent the communication between the two housings for the balancing weights.

Because of its small dimensions, the access door is easily and to advantage integrated with the profile of the blade surface in which the aforesaid access door emerges, and the aforesaid door can be simply fixed on the blade, for example by gluing on the corresponding surface of the casing, around the aforesaid blind cavity.

For security, the aforesaid access door is to advantage moreover screwed on a screw passing through the surface of the blade other than that in which the aforesaid access opening emerges, the aforesaid screw emerging in the aforesaid casing blind cavity. This screw can be the screw of a target carrier, which supports a target mounted on the blade intrados for its passage to the test bench.

As the casing is made or manufactured substantially to the blade profile, it is advantageous that the extrados and intrados coatings of the blade are integral respectively with the extrados and intrados surfaces of the casing, preferably by at least one structural glue film. To facilitate an economic manufacturing or creation of the casing, it is advantageous that the housings emerge laterally in the two large lateral surfaces of the casing as well as, preferably, in the internal end surface of the casing, turned towards the blade root, whereas each housing is closed on the side of the external end surface of the casing, turned towards the blade tip, by a preferably concave back, against which is intended to be applied a rigid stop interposed between the aforesaid back and the weights housed in the aforesaid housing.

To ensure a total security of the balancing device under the flight forces, the casing is to advantage enclosed in the blade structure, and, to this end, the housings are to advantage at least closed laterally by at least one structural component of the blade, retaining the aforesaid weights in the housings and encircling at least partially the aforesaid casing constituting at least one casing retaining stop along the span and/or along the chord of the blade.

This blade structural component can be at least one leading edge spar and/or at least one bundle of reinforcing fibre rovings agglomerated by a rigidified synthetic matrix, on the side of the trailing edge and/or on one at least of the longitudinal ends of the aforesaid casing.

To facilitate the extraction of the weights when an intervention on the static and dynamic adjustments is necessary, for example after a blade repair, the weights of the two sets intended to be housed in a same housing are threaded onto a same wire one end of which is connected to the aforesaid stop, interposed between the weights and the back of the housing, and the other end of which is free and accessible through the access opening when the weights are placed in this housing.

To ensure the holding of the weights in the external part, along the span, of the housings when the weights are not subjected to the centrifugal force, at least one flexible and light stop is to advantage housed in each of the two housings, between the aforesaid access opening and the balancing weights housed in the aforesaid housing. To advantage, this flexible stop is tubular and passed through by the free end of the wire on which are threaded all the weights housed in this housing.

To further advantage, the access opening is centred on the blade chord centring axis, which enables, in view of the small dimensions of this opening, recesses in the metal protection cover of the blade leading edge not to be made, so that this protection cover can be kept on the same chord percentage all along the blade span. This is particularly advantageous for the leading edge protection covers fitted with de-icers or anti-icers, and it is necessary to note that the reduced size of the access door and its base connection by gluing on the blade avoids risks of water infiltration.

For reasons of manufacturing convenience of the blade as well as to facilitate accessibility to the balancing device when the blade is on the dynamic bench, it is advantageous that the access opening opens in the blade extrados surface.

Concerning the balancing weights, the first set of weights, for the static balancing, is advantageously in a high density metal or alloy, and includes weights of the same external shape, of the same section corresponding substantially to the transverse section of each housing, with possibly several thicknesses in the length direction of the aforesaid housing, so that these weights have different masses, which enables a fine adjustment. The dynamic weights of the second set of weights are supported, in each housing, against the weights of the first set housed in this housing, and the weights of the second set comprise also weights of the same external shape, of the same section corresponding substantially to the section of each housing, and of the same thickness, but made of two high density metals or metal alloys, such that the density of one is approximately twice the density of the other.

Such a balancing device enables using a static and dynamic blade balancing process with the aid of weights, which is particular to the invention, and which consists, at first, in equally distributing by mass the static balancing weights in the two housings, then in placing in the two housings the dynamic balancing masses of lowest density so as to distribute their mass equally in the two housings, supported on the static balancing weights, so as to set up the desired static moment, then, secondly, after identification of the aerodynamic behaviour of the blade on the balancing bench, in removing a number n of dynamic balancing weights from each of the two housings and in adding a number n of dynamic balancing weights of higher density in only one of the two housings, in order to create a chord moment obtaining the looked for dynamic balancing, while keeping the preestablished static moment. This process can also be used with a device comprising at least two access openings, each of which communicates with respectively one of the two elongated housings receiving the weights.

BRIEF DESCRIPTION OF THE DRAWINGS

Other advantages and characteristics of the invention will follow from the description given below, as a non-restrictive example, of a version example described by reference to the appended drawings in which.

DETAILED DESCRIPTION OF THE INVENTION

Figure 1:
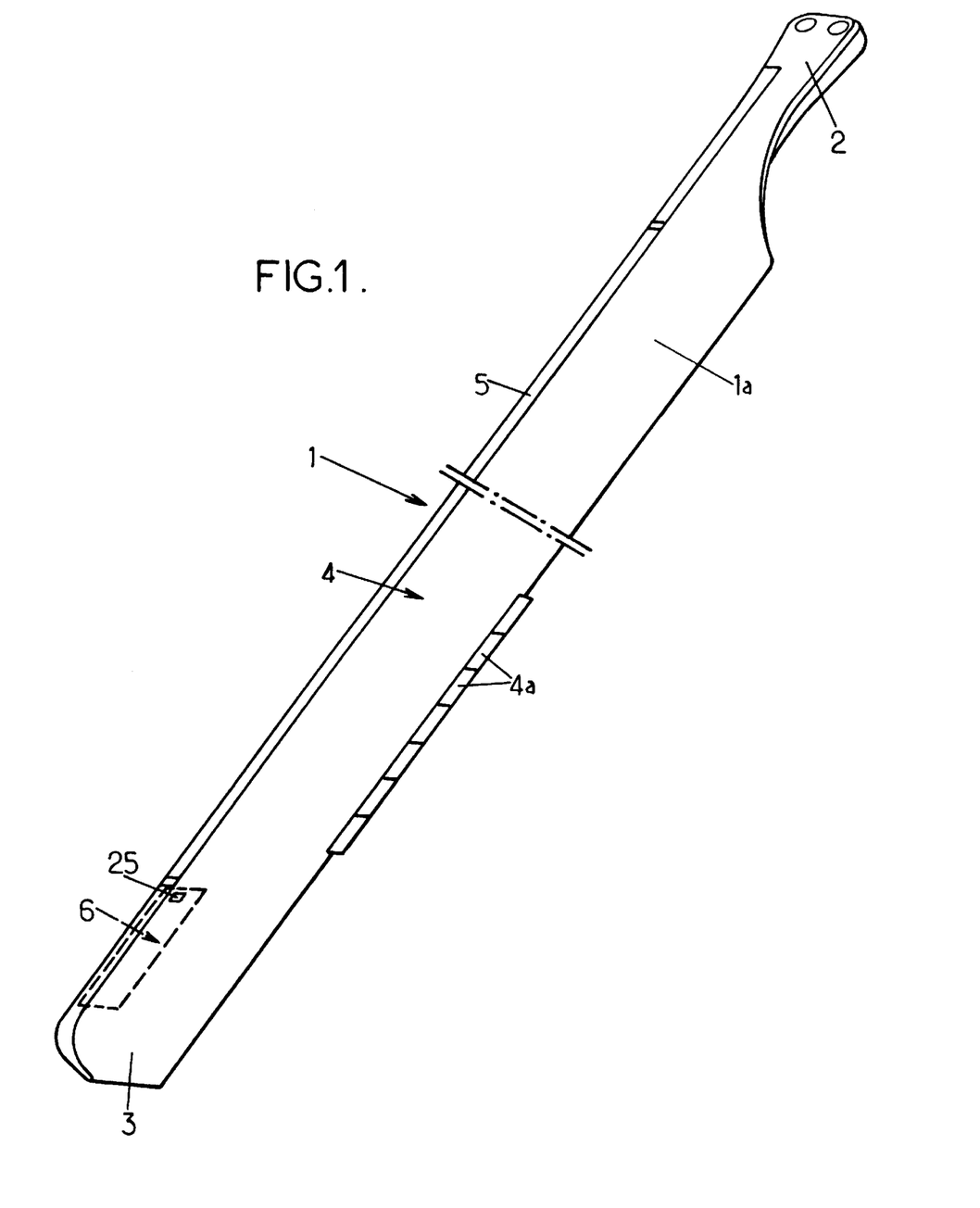
FIG. 1 is a diagrammatic perspective view of a helicopter main rotor blade fitted with a static and dynamic balancing device of the invention.

FIG. 1 shows a blade 1 of a helicopter main rotor, the blade 1 comprising a blade root 2, for its connection to a rotor hub, and which is extended, along the span of the blade 1 and outwards, as far as a blade tip or blade tip cap 3, by a an aerodynamic profile main blade section 4, which extends over the major part of the span of the blade 1 and is fitted with trailing edge tabs or small flaps 4a. The leading edge of this blade 1 is protected, substantially from the blade root 2 to the blade tip cap 3, by a metal protection cover 5, for example in stainless steel, which extends over a constant chord percentage on the extrados or suction surface 1a as on the intrados or pressure surface 1b of the blade 1, from its leading edge.

Figure 2:
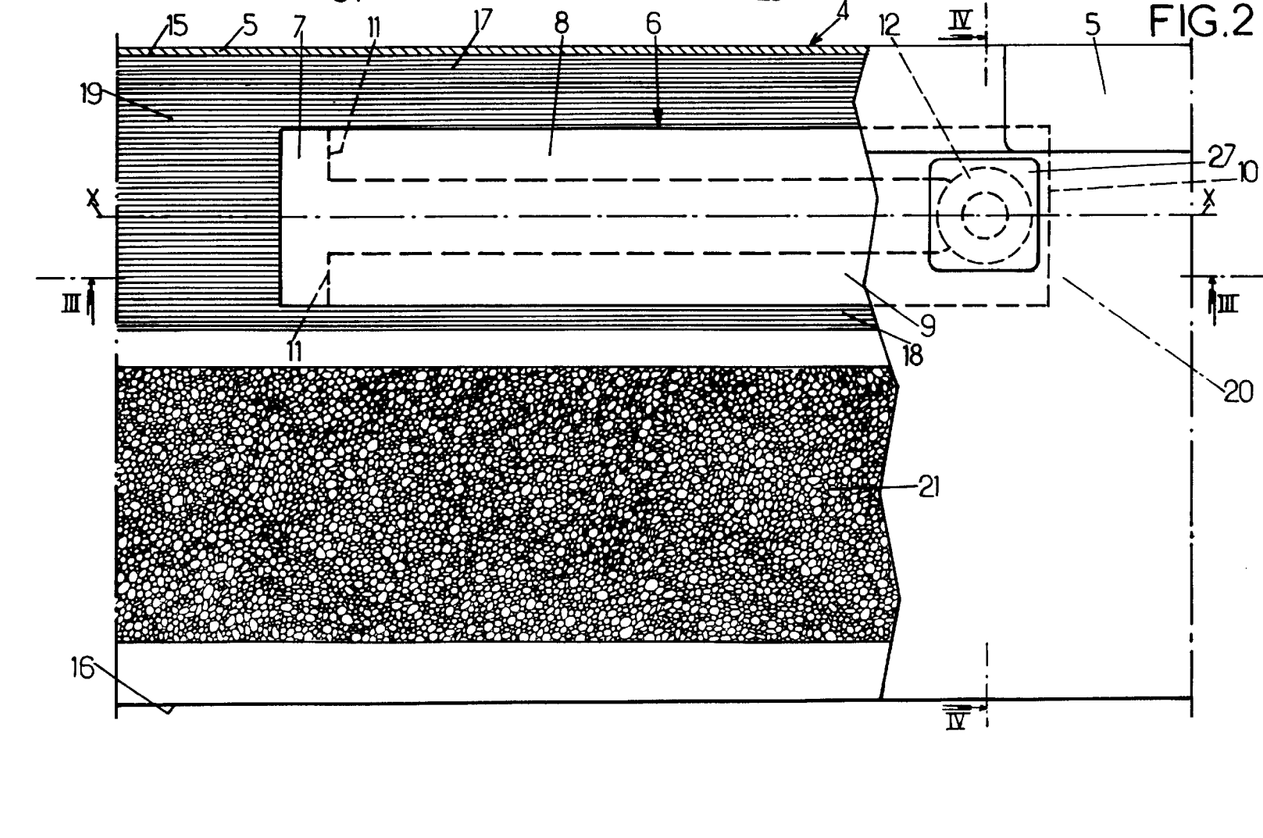
FIG. 2 is a diagrammatic part section and part elevation view of the blade of FIG. 1, along a plane at mid thickness of the profile, in the external end portion of the main blade section of the blade of FIG. 1.
Figure 3:
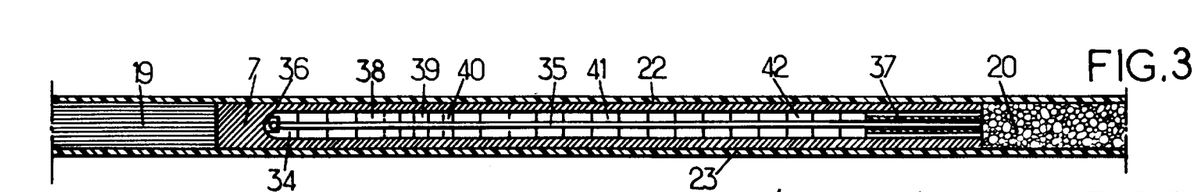
FIG. 3 is a longitudinal section along III—III of FIG. 2.
Figures 4, 7, 8, 9:
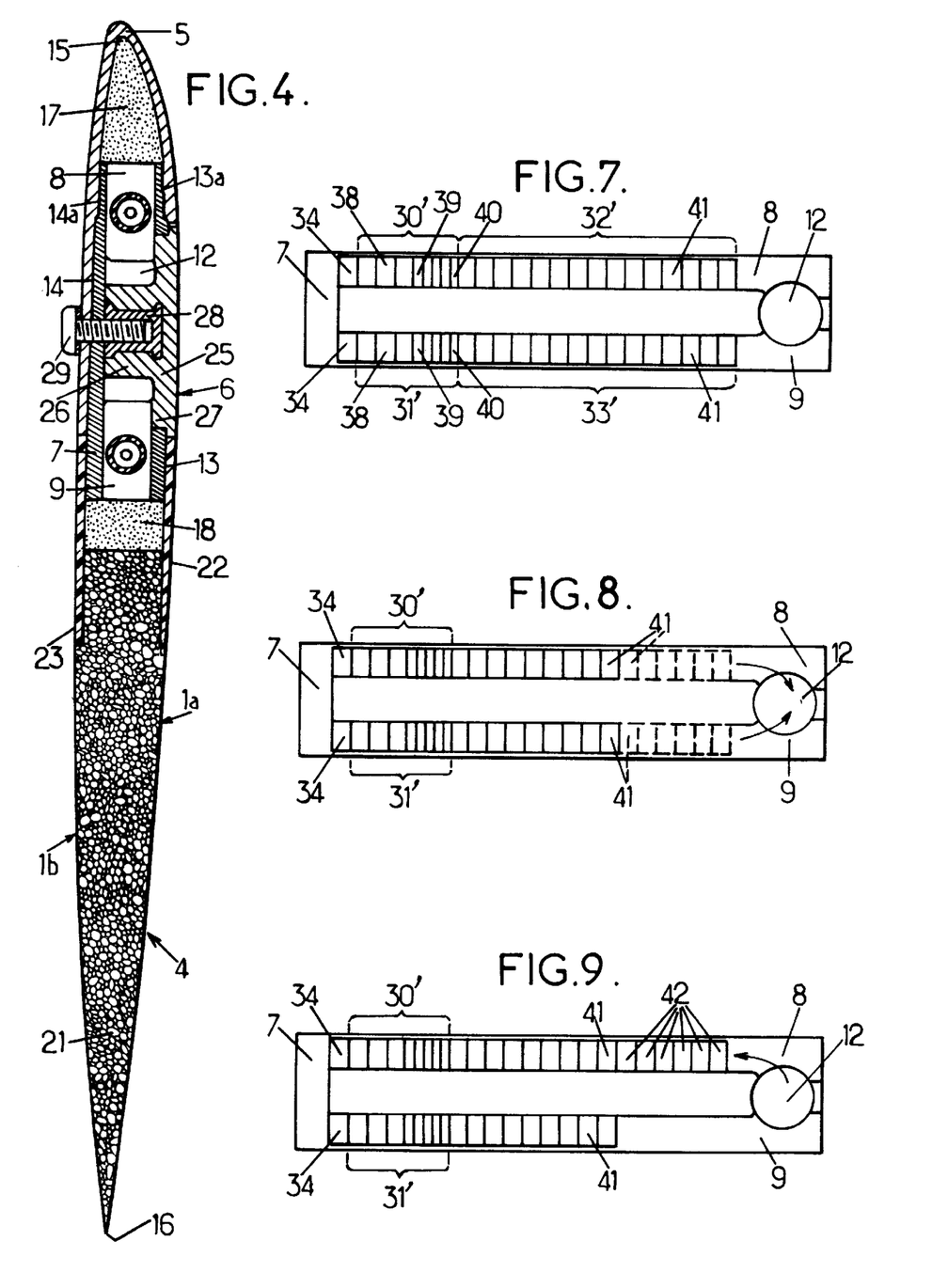
FIG. 4 is a section along the chord and along IV—IV of FIG. 2, to a different scale.
FIGS. 7, 8 and 9 are diagrammatic plan views of the balancing weights housed in the two housings of the device casing during three successive and particular phases of the balancing process according to the invention.
Figure 5:
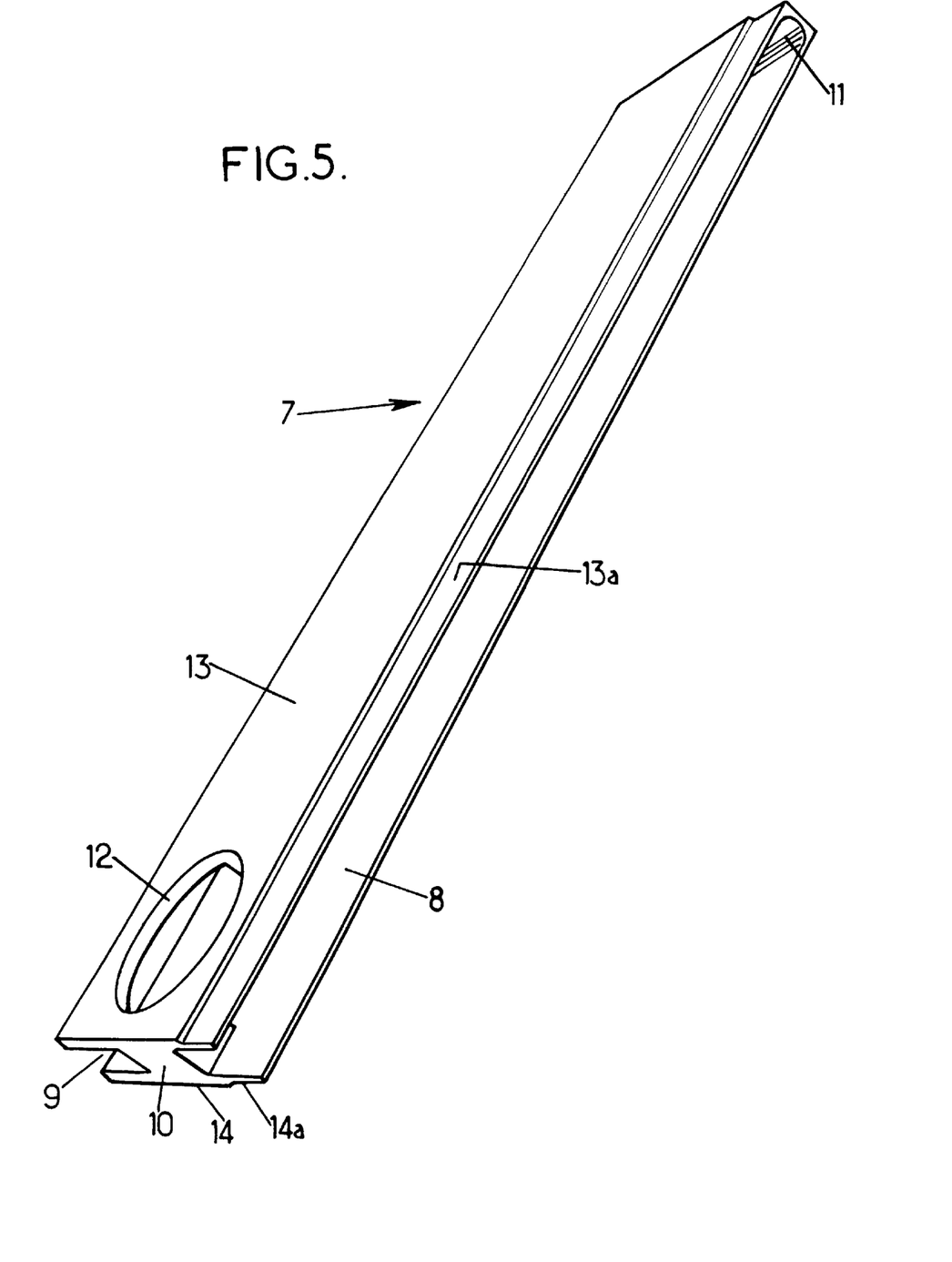
FIG. 5 is perspective diagrammatic view of an example of balancing weights support casing for the blade of FIGS. 1 to 4.

In the external end portion, along the span, of the main blade section 4, i.e. in the portion adjacent or contiguous to the blade tip cap 3, the blade 1 comprises a static and dynamic balancing device 6, shown in its entirety in dashed lines in FIG. 1, because integrated in the profile of the main blade section 4 of the blade, and a main component of which is a support casing for the weights, which casing 7 is shown in the sections of FIGS. 2 to 4 and in perspective in FIG. 5. This casing 7 is a rigid casing, of general elongated parallelepipedic shape, in which to longitudinal deep grooves 8 and 9, of the same rectangular transverse section, are made in the two large lateral surfaces of the casing 7. These two grooves 8 and 9 thus delimit elongated housings, of rectangular transverse section, open laterally respectively to the front and to the rear of the casing 7, and also open in the internal longitudinal end surface of the casing 7, i.e. the small end surface of this casing 7 which is turned towards the blade root 2 when the casing 7 is integrated in the blade 1 and directed longitudinally along the span of this blade 1, so that the longitudinal and central axis of the casing 7 is merged with the chord centring axis X—X of the blade 1, substantially in the front quarter of the chord of the blade 1 and at mid-thickness of its profile, the two housings 8 and 9 then being symmetrical one with the other, on either side the chord centring axis X—X of the blade 1. At the external longitudinal end of the casing 7, i.e. the end turned towards the blade tip 3, in this position of the casing 7 in the blade 1, each of the grooves 8 and 9 is closed by a concave back 11, of semi-cylindrical shape (see FIG. 5). A cylindrical blind bore 12 is made in the casing 7 and emerges in the part of the extrados surface 13 of this casing 7 which is next to its internal longitudinal end 10. This cylindrical bore 12 is of a sufficient diameter to emerge, inside the casing 7, laterally into the grooves 8 and 9 through passages of sufficient section for the introduction of weights, described below, in the grooves 8 and 9 through the opening of the bore 12, as well as for the withdrawal of these weights outside the casing 7.

The bore 12 is centred on the longitudinal axis of the casing 7, merged with the chord centring axis X—X and the axis of the bore 12 is perpendicular to this axis X—X. Thus the opening of the bore 12 is in permanent communication with the internal end (towards the blade root 2) of each of the grooves 8 and 9.

To facilitate the integration of the casing 7 in the external end portion of the main blade section 4, and in particular the integration of the transverse section of the casing 7 in the profile of this portion of the main blade section 4, the casing 7 has a transverse section machined or adjusted to correspond substantially with this profile, and, to this end, two longitudinal recesses 13a and 14a are made in the lateral edges of the extrados 13 and intrados 14 surfaces of the casing 7 which between them delimit the front groove 8, open laterally towards the leading edge 15 of the blade 1, while the rear groove 9 opens laterally towards the trailing edge 16 of the blade 1.

The casing 7 is held enclosed in the directions of the span and the chord of the blade 1, in the position integrated into this blade 1 which is shown in FIGS. 2 to 4, by stops made up of structural components of this blade 1, these stops simultaneously constituting lateral and internal end closing components of the grooves 8 and 9, so as to delimit in these grooves 8 and 9 two elongated and symmetrical housings on either side of the chord centring axis X—X, these housings only being accessible at their internal end, through the bore opening 12.

Along the chord and towards the leading edge 15, the casing 7 is abutted against a leading edge spar 17 which, in this example of a mainly composite blade 1, is constituted by a longitudinal bundle of reinforcement fibre rovings, for example of carbon fibres, compressed by a rigidifying synthetic resin.

Along the chord and towards the trailing edge 16, the casing 7 is abutted against another bundle 18 of reinforcement fibre rovings compressed by a rigidifying resin, of the same kind as the bundle of the spar 17, but of smaller transverse section.

Along the span and towards the blade tip 3, the casing 7 is abutted against a composite component 19, also of reinforcement fibre rovings by a resin, of the same kind for the fibres and the resin as the spar 17 and the bundle 18 and ensuring the connection between these two latter. These structural and composite components 17, 18 and 19 of the blade 1 ensure an excellent retention in position of the casing 7 against the forces which act on it, in particular the centrifugal forces from the rotor rotation, whereas along the span and towards the blade root 2, the casing 7 is abutted against a filling block 20, of a light cellular material, for example of foam, which is of the same kind as one or several trailing edge filling components 21, between the rear bundle of rovings 18 and the trailing edge 16, and between the extrados 22 and intrados 23 composite coatings of the blade 1. The foam stop 20 against the internal end surface 10 of the casing 7 is sufficient to retain the casing 7 towards the blade root 2, because no force acts on the casing 7 in the centripetal direction, on stopping as in rotation of the blade 1.

The structural and composite components 17, 18 and 19 of the blade thus constitute a belt partially surrounding the casing 7 and completed by the foam block 20, the leading edge spar 17 and the trailing edge bundle 18 laterally closing the grooves 8 and 9 respectively towards the leading edge 15 and towards the trailing edge 16 to retain the weights described below in the housings thus defined.

The extrados 22 and intrados 23 coatings of the blade 1, which are stratified coatings of reinforcement fibre layers compressed by a rigidified synthetic resin, are stuck by a film of structural glue respectively on the extrados 13 and intrados 14 surfaces of the casing 7, in particular on the rear parts of the these surfaces 13 and 14, the front parts of which are covered by the extrados and intrados flanges respectively of the leading edge protection cover 5, which cover 5 also envelops the leading edge spar 17 and is also connected to the spar 17 as well as to the casing 7 by a film of structural glue, with preferably the interposition of a glass fibre layer covered with resin.

If the mainly composite structure of the blade 1 does not allow the rotor inertia necessary for the windmilling of the rotor to be attained, in the event of failure of its rotational drive, the casing 7 not only supports the weights described below for the balancing of the blade, but constitutes moreover an added end mass, in order to attain the desired rotor inertia, by being machined substantially to the profile of the blade in a block of high density metal or metal alloy, for example stainless steel. This material is compatible with the connection process by gluing to the blade coatings 22 and 23, as well as with the chord position of the casing 7 in a blade 1 having particular geometrical constraints, such as a small chord and a small relative thickness of the profile.

On the other hand, in the case where the mass of the blade is sufficient to ensure the rotor inertia necessary for windmilling, for example in a metal blade or comprising more metal components than the composite blade described above, the casing 7 can be made in light alloy or in composite materials, in particular with a glass fibre base.

Figure 6:
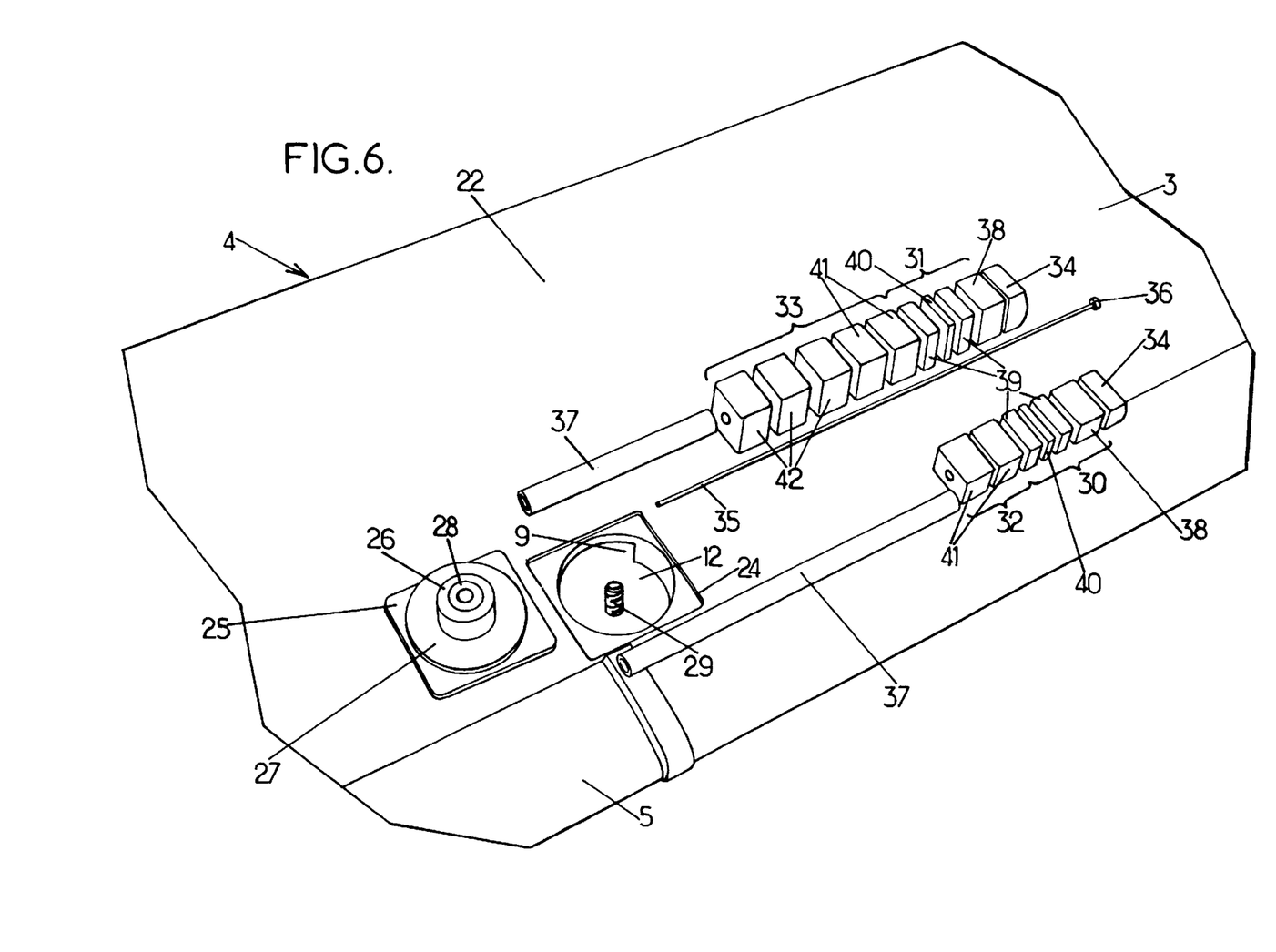
FIG. 6 shows balancing weights and associated parts for their placing in the housings of the casing of FIG. 5, these weights and associated parts being shown placed on the portion of the blade housing the casings, the access door of the device being open to free the access opening to the two housings.

To access the two grooves 8, 9 of the weights' housing through the bore 12 of the casing 7, an opening 24 is made in the extrados coating 22 of the blade 1, above the bore 12. This opening 24 is centred on the axis of the bore 12, and therefore on the chord centring axis X—X of the blade 1, and the shape of this opening 24, easily visible in FIG. 6, is for example square with a side slightly greater than the diameter of the bore 12. Thus, the bore 12 of the casing 7 appears made in the part of the extrados surface 13 of the casing 7 which is free under the opening 24 of the extrados coating 22 of the blade 1, in the internal longitudinal end part of the casing 7, and the dimensions of the opening 24, symmetrical relative to the blade chord centring axis X—X, are at the same time sufficient for the loading and unloading of the weights described below, and small with regard to the dimensions of the blade so that it is not necessary to make a recess in the cover 5. This cover 5 can thus comprise extrados and intrados flanges extended over the same chord percentage for each of them, over all the span of the blade 1. This characteristic is particularly attractive for the leading edge protection covers 5 which are fitted with de-icing or anti-icing. As an example, for a total useful length of a casing 7 of about 250 mm, the opening 24 is a square of only 40 mm side.

The balancing device of the blade 1 thus includes a single access opening, constituted by the opening 24 of the extrados coating 22 and of the bore 12 of the casing 7, opening in the extrados surface 1a of the blade 1 and centred on the chord centring axis X—X of the blade 1, for the introduction of the balancing weights in the grooves 8 and 9 of the casing 7, and for the withdrawal of these weights outside these grooves 8 and 9.

This access opening 24-12 is able to be closed by an access door 25 of composite materials (see FIG. 6), which has a complementary shape to that of the opening 24 in order to close it, and which is profiled to be integrated into the profile of the part of the extrados surface of the blade 1 in which the opening 24 has been made. In this example, the door 25 is therefore also square, and is fixed on the blade 1 by gluing the door 25 on the part of the extrados surface 13 of the casing 7 which surrounds the bore 12 and is disengaged through the opening 24, with the aid of a film of structural glue, this gluing and the small dimensions of the door 25 avoiding the risks of water infiltration into the blade, and this gluing being bound to be destroyed for the opening of the door 25, when the blade 1 must be re-balanced, for example after repair on the blade 1.

To avoid the balancing weights being able to accidentally pass, in service, from one groove 8 or 9 to the other, a cylindrical pin 26 is integral with a surface of a circular disc 27, of slightly smaller diameter than that of the bore 12 of the casing 7, and fixed by its other surface against the internal surface of the door 25, so that the disc 27 fits in the bore 12 and the pin 26 occupies the central volume of this bore 12 when the door 25 is closed in the opening 24. The pin 26 and the disc 27 are preferably also of composite materials, of the same kind as the door 25, so that the whole weight is small.

To ensure a double fixing security of the door 25 on the blade 1, a nut 28 is set in the pin 26 of the door 25, and when this door 25 closes the opening 24, a screw 29 (see FIG. 4), engaged in the blade 1 through the intrados surface 1b of this latter, and therefore passing through the intrados flange of the cover 5 or the intrados coating 23, as well as the intrados surface 14 of the casing 7, has its shank emerging in the bore 12 and can be screwed into the nut 28 of the pin 26 housed in this bore 12. This screw 29 can be the fixing screw of a target carrier used on the test bench.

The balancing device 6 also includes two sets of balancing weights, a first set of static balancing weights, and a second set of dynamic balancing weights, also contributing to the static balancing. Each of the grooves 8 and 9 of the casing 7 always house a half of the static weights of the first set, which are thus equally distributed by mass in the two grooves 8 and 9, each of which also houses practically always dynamic weights of the second set, distributed in a manner described below in reference to FIGS. 7 to 9.

In FIG. 6, 30 globally designates the four static weights forming a half of the first set of weights and intended to be housed in the front or leading edge groove 8, and 31 globally designates the four static weights of the second half of the first set of weights, intended to be received in the rear or trailing edge groove 9, and in the same way 32 designates the two dynamic weights of the second set of weights, intended to be received in the groove 8, and 33 designates the five dynamic weights of the second set intended to be received in the groove 9. These weights of the two sets have all the same general external shape of a parallelepiped rectangle with transverse section corresponding to the rectangular transverse section of the grooves 8 and 9, in order that these latter constitute runners for the weights. All the weights are drilled with a central channel of small diameter along their thickness, i.e. along the length of the grooves 8 and 9, in order that all the weights housed in the same groove 8 or 9 are threaded onto the same flexible, resistant wire 35, for example of nylon (registered trademark) of which one end is integral with a small stop 36. A rigid stop 34, of the same transverse section as the weights 30 to 33, but wath external convex surface (towards the blade tip 3), complementary to the concave back 11 of each groove 8 or 9, is at first threaded on the wire 35 so that the small stop 36 is embedded in a small central cavity in the external convex surface of the rigid stop 34. Then the static weights 30 or 31 are threaded on the wire 35 one against the other and against the rigid stop 34, and then the dynamic weights 32 or 33 are in their turn threaded one against the other and against the static weights 30 or 31 on the wire 35. The set of weights housed in the same groove 8 or 9 is thus mounted on the same wire 35 and can be introduced through the access opening 24-12 in the corresponding groove 8 or 9, so that the end rigid stop 34 is supported against the concave back 11 of this groove, and is interposed between this back 11 and the weights. To maintain the weights in the external part (towards the blade tip 3) of the groove 8 or 9, even when the blade 1 does not rotate, the free end of the wire 35 is engaged in a flexible and light mechanical stop 37, constituted for example from a piece of plastic material tube such as polyurethane, cut to the appropriate length to be housed in the groove 8 or 9, between the weights and the bore 12. The free end of each wire 35, accessible directly or after removal of the corresponding piece of tube 37, facilitates the extraction of the weights outside the grooves 8 and 9.

As already stated, the static balancing weights are equally distributed by mass in the grooves 8 and 9, in two identical halves of the first set of weights which constitute the sets 30 and 31 of FIG. 6. The static weights are generally of substantially the same cubic shape as the weight 38, but, for a fine adjustment, the static weights can comprise weights having a thickness which is a sub-multiple of that of the weight 38, for example half for the two weights 39 of each set 30 and 31 or a quarter for the weight 40 of each of these two sets 30 and 31. These weights 38, 39, 40 of different thicknesses, have therefore different masses in order to have a choice which enables a fine adjustment. The quantity of static weights is determined during the static adjustment to correspond to a global mass able for example to reach 400 grams. These weights are of high density metal or metal alloy, for example in stainless steel.

When the dynamic adjustment of the blade 1 has been carried out, the dynamic weights of the sets 32 and 33 are in general dissymmetrically distributed by mass in the two grooves 8 and 9, so as to create a moment around the chord centring axis X—X, while keeping a pre-established static moment with all the static and dynamic masses in the two grooves 8 and 9.

In a way appropriate to the invention, the set of dynamic weights comprises weights of the same external shape, possibly, but not inevitably, of the same thickness, but made from two high density metals or metal alloys, and such that the density of one is substantially double the density of the other. The sets 32 and 33 of dynamic weights housed in the two grooves 8 and 9 respectively include the same number of identical lowest density metal or metal alloy weights 41 (two weights 41 in FIG. 6), whereas the set 33, which includes the greatest number of dynamic weights, includes in addition a certain number of double density metal or metal alloy weights 42 (three weights 42 in FIG. 6), so as to introduce the required chord moment.

To reach this static and dynamic adjustment, with the aid of the device described above, the following process described with reference to FIGS. 7 to 9 is carried out.

In FIGS. 7 to 9, the casing 7 with its grooves 8 and 9 for housing the balancing weights has been shown diagrammatically as well as the inlet and outlet bore 12 for these weights.

As already stated, the static balancing weights are equally distributed by mass in the grooves 8 and 9, each of which houses one of two identical halves of the first set of weights according to two sets 30' and 31'. If the total mass of the static weights is 400 g, each of the sets 30' and 31' has static weights of mass 200 g, in the same metal or metal alloy, with certain weights 39 and 40 having thicknesses which are whole fractions of the thickness of reference weights 38 having the same unit mass.

Initially, the dynamic balancing weights of the second set are placed like the static weights, i.e. equally distributed in the grooves 8 and 9, in two sets 32' and 33' comprising the same number of dynamic weights 41, identical to each other and of the same unit mass, for example 20 g, in the lowest density metal or metal alloy, although this density is however high. The quantity of dynamic weights 41 is fixed, whatever is the particular type of blade 1 designed and considered, and this quantity of weights corresponds to a fixed dynamic mass defined during the design of the blade, for example 600 g. This initial balancing process is drawn in FIG. 7, in which half of the dynamic weights 41, of the lowest density metal or metal alloy, and having a mass of 300 g, is housed in each of the to grooves 8 and 9, against half of the static weights 38, 39 and 40 housed in this same groove 8 or 9, and having a mass of 200 g, i.e. a total of 500 g of balancing weights of the to sets in each groove 8 or 9.

The blade having thus a static moment established by means of the two sets of weights with a total mass of 1 kg, is then passed to the test bench for identification of its aerodynamic behaviour. After this identification, the dynamic adjustment is carried out, as drawn in FIG. 8, by withdrawing a number n of dynamic weights 41 (in the event six weights 41 shown in dotted lines) for each of the grooves 8 and 9, which amounts to decreasing the mass of weights contained in each groove 8 or 9 by a value of n×20 g, then, as shown diagrammatically in FIG. 9, to adding n dynamic weights 42, made of the densest metal or metal alloy, in one or other of the cavities 8 or 9, i.e. to adding in this cavity a mass of n×40 g in the example considered, in order to create a chord moment, while keeping the preestablished moment. The arrows of FIG. 8 show diagrammatically the withdrawal of the n dynamic weights 41 of 20 gm each, whereas the arrow of FIG. 9 shows diagrammatically the placing of the n dynamic weights 42 of 40 g each in the leading edge groove 8.

Consequently, the distribution of the static weights 38, 39 and 40 has not been modified, and only the distribution of the dynamic weights 41 and 42 has been modified without modifying the total mass of dynamic weights, but by substituting n dynamic weights 42 of double unit mass for n dynamic weights 41 of standard unit mass in one of the two grooves 8 and 9, and by withdrawing n dynamic weights 41 of standard unit mass from the other of the two grooves.

The process of static and dynamic adjustment described above necessitates the use, for the dynamic adjustment, of two different density materials, the first, of lowest density, being of standard quality stainless steel for example, and the second, of density double that of the first, being preferably a high density sintered material, and therefore more expensive. But this process requires high density material for only quantities necessary to the dynamic adjustment of the blades, and this process can be used in so far as the grooves 8 and 9 are dimensioned on the basis of the lowest density material. The dynamic transfer capacity is optimum when the density ratio between the two materials is approximately 2.

In the example described above, to facilitate the dynamic balancing of the blades on the test bench with a good accessibility, as well as to facilitate the moulding of the composite blade, the access opening emerges in the extrados surface of the blade. But this access opening could emerge in the intrados surface without the weights falling out, following opening of the access door.

Indeed, throughout the design of the balancing device described above, a total security is ensured under flight forces, and in particular under the centrifugal force because, when the blade rotates on the rotor, the weights are pushed back to abut on the concave back 11 of the grooves 8 and 9 under the action of the centrifugal force, and the door 25 is not therefore subjected to any force induced by these weights. These latter stay inside the housings of the grooves 8 and 9 in the event of loss of the door 25, when the blade rotates, and the balancing of the blades is more or less retained, because of the low weight of this door 25, which allows the continuance of the flight.

The balancing device 6 described above is therefore easy and relatively cost effective to use, and enables release from all the aforementioned disadvantages of similar devices of the prior art presented above. In particular, the blade tip 3 can be of parabolic shape, or have any other shape such as a dihedral for example, and does not require to be dismantled in the event of intervention on the balancing weights.

The process of the invention can also be used with a variant of the device described above, a variant in which each of the two elongated housings is accessible through respectively one of two access openings for the loading and unloading of the static and dynamic balancing weights.

What is claimed is:

1. A rotor aircraft rotor blade fitted with a static and dynamic balancing device in an external end portion, towards a blade tip, of an aerodynamic profiled main blade section, of the blade, said balancing device including static balancing weights and static and dynamic balancing weights which are housed in at least two cavities delimited, on either side a chord centring axis of the blade, in said external end portion of the blade main blade section, and accessible from outside the blade through one access opening which opens in a surface of the blade and able to be closed by one access door on said surface of the blade, wherein said cavities of the balancing device are arranged in two elongated housings substantially in the direction of the span of the blade and substantially symmetrical to each other on either side said chord centring axis, the device including a single access opening which opens in one of the extrados and intrados surfaces of the blade, and in communication with an internal end, towards a blade root, of each of the two elongated housings, so as to enable the introduction and withdrawal of each weight into and from each housing, a first set of weights, for the static balancing, the first set of weights to be equally distributed by mass in the two housings, and a second set of weights for the static and dynamic balancing, the second set of weights to be distributed by mass in the two housings so as to ensure a dynamic adjustment of the blade.

2. A rotor blade according to claim 1, wherein the balancing device includes a support for the balancing weights, said support being a rigid and elongated casing, integrated in said external end portion of the main blade section of the blade so that the length of the casing is directed substantially along the span of the blade, and the casing has a transverse section which is integrated in said aerodynamic profile of said main blade section of the blade, the two housings being at least partially delimited in said casing, said access opening being at least partially delimited in said casing.

3. A blade according to claim 2, wherein the two housings are at least partially delimited by two longitudinal grooves each made in respectively one of two large lateral surfaces of the casing which two large lateral surfaces are turned respectively towards the leading edge and the trailing edge of the blade.

4. A blade according to claim 2, wherein said access opening includes an opening made in a coating of the extrados or intrados surface of the blade and a substantially cylindrical and blind cavity, made in the extrados or intrados surface of the casing which the blind cavity appears under said opening of the coating, in the internal longitudinal end part of the casing, towards the blade root.

5. A blade according to claim 4, wherein said access door closes said opening in the coating of the blade, and includes a pin projecting onto an internal surface of the door to close at least partially said blind cavity made in the casing, so as to prevent the communication between the two housings for the balancing weights.

6. A blade according to claim 4, wherein said access door is integrated in the profile of the surface of the blade in which emerges said access opening, and said door is glued onto the corresponding surface of the casing around said blind cavity.

7. A blade according to claim 6, wherein said access door is moreover screwed onto a screw passing through the surface of the blade other than that in which said access opening emerges, said screw emerging in said blind cavity of the casing.

8. A blade according to claim 2, wherein the blade includes extrados and intrados coatings which are integral respectively with the extrados and intrados surfaces of the casing.

9. A blade according to claim 2, wherein said housings emerge laterally in two large lateral surfaces of said casing as well as in an internal end surface of the casing, turned towards the blade root, whereas each housing is closed on the side of the external end surface of the casing, turned towards the blade tip, by a back, against which is intended to be applied a rigid stop interposed between said back and the weights housed in said housing.

10. A blade according to claim 9, wherein said weights of the two sets intended to be housed in the same housing are threaded on a same wire one end of which is connected to said stop and the other end of which is free and accessible through said access opening when said weights are placed in said housing.

11. A blade according to claim 2, wherein said housings are at least laterally closed by at least one structural component of the blade, retaining said weights in the housings and ringing at least partially said casing by constituting at least one retaining stop for the casing along the span and along the chord of the blade.

12. A blade according to claim 11, wherein said structural component of the blade is at least one spar of the leading edge and at least one bundle of reinforcement fibre rovings compressed by a rigidified synthetic matrix on the side of the trailing edge and of one at least of the longitudinal ends of said casing.

13. A blade according to claim 2, wherein said casing is machined substantially to the profile of the blade, and in a heavy metal or alloy to constitute an added mass at the end of the blade, in order to reach a rotor inertia necessary for the windmilling of this latter.

14. A blade according to claim 1, wherein said casing is in composite or in light alloy.

15. A blade according to claim 10, wherein at least one flexible and light stop is housed in each of the two housings, between said access opening and the balancing weights housed in said housing.

16. A blade according to claim 15, herein said flexible stop is tubular and passed through by said other end of said wire on which are threaded all the weights housed in said housing.

17. A blade according to claim 1, wherein said access opening is centred on said chord centring axis of the blade.

18. A blade according to claim 1, wherein said access opening opens in the extrados surface of the blade.

19. A blade according to claim 1, wherein said first set of weights, in high density material, includes weights of the same external shape, of the same section corresponding substantially to the transverse section of each housing, with several thicknesses, in the direction of the length of said housing, for a fine adjustment.

20. A blade according to claim 1, wherein said second set of weights includes weights which are supported, in each housing, against those of the first set housed in said housing, and comprises also weights of the same external shape, of the same section corresponding substantially to the section of each housing, and of the same thicknesses, but made in two high density materials, such that the density of one is substantially double the density of the other.

21. A static and dynamic balancing process of a rotor aircraft rotor blade fitted with a balancing device according to any one of the claims 1 to 20, said process including at least stages consisting, initially, in distributing equally by mass the static balancing weights in the two housings, then in placing in the two housings the lowest density dynamic balancing weights so as to distribute them equally by mass in the two housings, supported on the static balancing weights, so as to establish the desired static moment, then, secondly, after identification of the aerodynamic behaviour of the blade on. a balancing bench, in withdrawing a number n of dynamic balancing weights from each of the two housings and in adding a number n of highest density dynamic balancing weights in only one of the two housings, in order to create a chord moment obtaining the looked for dynamic balancing, while keeping the pre-established static moment.

* * * * *